(12) United States Patent
Sakamoto et al.

(10) Patent No.: US 10,645,612 B2
(45) Date of Patent: May 5, 2020

(54) WIRELESS COMMUNICATION DEVICE AND WIRELESS COMMUNICATION METHOD FOR TRANSMITTING AN AGGREGATED PHYSICAL LAYER PROTOCOL DATA UNIT FOR MULTIPLE USERS

(71) Applicant: Panasonic Intellectual Property Management Co., Ltd., Osaka (JP)

(72) Inventors: Takenori Sakamoto, Kanagawa (JP); Hiroyuki Motozuka, Kanagawa (JP); Masataka Irie, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 120 days.

(21) Appl. No.: 15/765,446

(22) PCT Filed: Jul. 7, 2016

(86) PCT No.: PCT/JP2016/003224
§ 371 (c)(1),
(2) Date: Apr. 2, 2018

(87) PCT Pub. No.: WO2017/077665
PCT Pub. Date: May 11, 2017

(65) Prior Publication Data
US 2018/0279170 A1    Sep. 27, 2018

(30) Foreign Application Priority Data

Nov. 4, 2015    (JP) .................................. 2015-216766

(51) Int. Cl.
| | |
|---|---|
| *H04B 7/06* | (2006.01) |
| *H04W 28/06* | (2009.01) |
| *H04W 16/28* | (2009.01) |
| *H04W 84/12* | (2009.01) |
| *H04B 7/08* | (2006.01) |
| *H04L 27/26* | (2006.01) |
| *H04L 29/06* | (2006.01) |
| *H04J 11/00* | (2006.01) |

(52) U.S. Cl.
CPC .......... *H04W 28/06* (2013.01); *H04B 7/0695* (2013.01); *H04B 7/0802* (2013.01);
(Continued)

(58) Field of Classification Search
CPC ..... H04L 47/41; H04L 27/2692; H04B 7/088; H04B 7/0802; H04B 7/0695; H04J 11/0053
See application file for complete search history.

(56) References Cited

U.S. PATENT DOCUMENTS

2010/0260114 A1    10/2010 Vermani et al.
2011/0299468 A1    12/2011 Van Nee et al.
(Continued)

FOREIGN PATENT DOCUMENTS

JP    2012-523771 A    10/2012
JP    2015-164329 A    9/2015
(Continued)

OTHER PUBLICATIONS

Extended European Search Report, dated Sep. 26, 2018, for the related European Patent Application No. 16861743.9, 9 pages.
(Continued)

*Primary Examiner* — Salvador E Rivas
(74) *Attorney, Agent, or Firm* — Seed IP Law Group LLP

(57) ABSTRACT

The present disclosure provides a wireless communication device provided with: a transmission signal generation unit that generates an A-PPDU that has a legacy preamble, a legacy header, data fields allocated to each of a plurality of different STAs, a plurality of non-legacy headers in which various types of information relating to the plurality of data fields are described, and a plurality of non-legacy preambles; and a transmission unit that transmits the A-PPDU in a wireless manner.

12 Claims, 23 Drawing Sheets

(52) U.S. Cl.
CPC ......... *H04B 7/088* (2013.01); *H04L 27/2692* (2013.01); *H04L 69/08* (2013.01); *H04L 69/22* (2013.01); *H04W 16/28* (2013.01); *H04W 84/12* (2013.01); *H04J 11/0053* (2013.01); *Y02D 70/00* (2018.01); *Y02D 70/142* (2018.01)

(56) References Cited

U.S. PATENT DOCUMENTS

| | | | |
|---|---|---|---|
| 2014/0093005 A1 | 4/2014 | Xia et al. | |
| 2014/0112230 A1* | 4/2014 | Sammour | H04J 3/0605 370/311 |
| 2016/0323861 A1* | 11/2016 | Cordeiro | H04B 7/0452 |

FOREIGN PATENT DOCUMENTS

| | | |
|---|---|---|
| WO | 2009/113005 A2 | 9/2009 |
| WO | 2014/052879 A1 | 4/2014 |

OTHER PUBLICATIONS

International Search Report of PCT application No. PCT/JP2016/003224 dated Aug. 9, 2016.
IEEE Std 802.11ad(TM)—2012 IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012 (9.13a DMG A-PPDU Operation).

* cited by examiner

FIG. 2

| SCRAMBLER INITIALIZATION | MCS | LENGTH | ADDITIONAL PPDU | PACKET TYPE | TRAINING LENGTH | AGGREGATION | BEAM TRACKING REQUEST | LAST RSSI | TURNAROUND | RESERVED BITS | HCS |
|---|---|---|---|---|---|---|---|---|---|---|---|
| 103a | 103b | 103c | 103d | 103e | 103f | 103g | 103h | 103i | 103j | 103k | 103l |

| SCRAMBLER INITIALIZATION | MCS | LENGTH | ADDITIONAL PPDU | PACKET TYPE | TRAINING LENGTH | AGGREGATION | BEAM TRACKING REQUEST | LAST RSSI | TURNAROUND | DESTINATION TYPE | RESERVED BITS | HCS |
|---|---|---|---|---|---|---|---|---|---|---|---|---|
| 303a | 303b | 303c | 303d | 303e | 303f | 303g | 303h | 303i | 303j | 303m | 303k | 303l |

| 503 | | | | | | | | | | | | | |
|---|---|---|---|---|---|---|---|---|---|---|---|---|---|
| SCRAMBLER INITIALIZATION | MCS | LENGTH | ADDITIONAL PPDU | PACKET TYPE | TRAINING LENGTH | AGGREGATION | BEAM TRACKING REQUEST | LAST RSSI | TURNAROUND | NON-LEGACY INDICATION | DESTINATION TYPE | RESERVED BITS | HCS |
| 303a | 303b | 303c | 303d | 303e | 303f | 303g | 303h | 303i | 303j | 503n | 503m | 303k | 303l |

| DESTINATION INFORMATION | MCS | LENGTH | ADDITIONAL NON-LEGACY PPDU | HCS |
| --- | --- | --- | --- | --- |
| 401a | 401b | 401c | 401e | 401d |

WIRELESS COMMUNICATION DEVICE AND WIRELESS COMMUNICATION METHOD FOR TRANSMITTING AN AGGREGATED PHYSICAL LAYER PROTOCOL DATA UNIT FOR MULTIPLE USERS

TECHNICAL FIELD

The present disclosure relates to a method for aggregating physical layer protocol data units (PPDU: PLCP protocol data unit, PLCP: physical layer convergence protocol) addressed to different users, and a wireless communication device and a wireless communication method for transmitting aggregated PPDUs.

BACKGROUND ART

Wireless communication that uses millimeter wave bands is attracting the interest of people due to licensing not being required and so forth. The IEEE 802.11ad standard is a wireless communication standard for millimeter wave bands that has been standardized by the IEEE (Institute of Electrical and Electronics Engineers) (see NPL 1).

The technology stipulated in the IEEE 802.11ad standard enables multi-gigabit high-speed digital communication. Furthermore, the IEEE 802.11ad standard supplements and extends the MAC (media access control address) layer of IEEE 802.11, and has backward compatibility with the IEEE 802.11 WLAN (wireless local area network) standard.

In addition, the IEEE 802.11ad standard supports centralized network architecture such as an infrastructure BSS (basic service set) and a PBSS (personal BSS) in the MAC layer. Here, centralized network architecture is a network structure in which a central coordinator such as an access point (AP) or a personal BSS control point (PCP) transmits beacons for all stations (STAs) within the network to be synchronized.

Furthermore, in the IEEE 802.11ad standard, directional communication is carried out using beamforming in a wider range compared to other IEEE 802.11 WLAN standards that operate in the 2.4-GHz or 5-GHz frequency bands.

The IEEE 802.11ad standard can provide PHY (physical layer) data transmission speeds of 6.7 Gbps at maximum by using a bandwidth of 2.16 GHz. In addition, in order to improve transmission efficiency, an aggregate PPDU (aggregate physical layer protocol data unit, hereinafter referred to as "A-PPDU") is supported in the physical layer of the IEEE 802.11ad standard. An A-PPDU can reduce the overhead and improve the data transmission speed by aggregating two or more PPDUs without including an IFS (Interframe Space) or a preamble in PPDU transmission.

In this way, the IEEE 802.11ad standard has been attracting attention due to having a large number of advantages such as excellent high-speed properties and backward compatibility, centralized network architecture, and supporting beamforming and A-PPDUs.

CITATION LIST

Non Patent Literature

NPL 1: IEEE 802.11ad-2012 P237 9.13a DMG A-PPDU Operation

SUMMARY OF INVENTION

Incidentally, the rapid spread of WLAN-mounted devices such as smartphones and tablet terminals in recent years has led to an increase in the number of STAs connecting to a single AP. In this kind of environment, rather than improving the maximum data transmission speed for a single STA, measures for how to effectively utilize wireless resources and for improving transmission efficiency of an entire network are required.

A non-limiting embodiment of the present disclosure provides a wireless communication device and a wireless communication method capable of maintaining backward compatibility with the IEEE 802.11ad standard in millimeter wave band wireless communication and improving the data transmission speed of an entire network.

A wireless communication device of an aspect of the present disclosure is provided with: a transmission signal generation unit that generates an aggregate physical layer protocol data unit including a legacy preamble that has backward standard compatibility, a legacy header that has the backward standard compatibility, one or more data fields that are addressed to each user, one or more non-legacy headers that do not have the backward standard compatibility and in which information relating to the one or more data fields is described, and one or more non-legacy preambles that do not have the backward standard compatibility and are addressed to each of the users; and a transmission unit that transmits the aggregate physical layer protocol data unit in a wireless manner.

A wireless communication method of an aspect of the present disclosure includes: generating an aggregate physical cal layer protocol data unit having a legacy preamble that has backward standard compatibility, a legacy header that has the backward standard compatibility, one or more data fields that are addressed to each user, one or more non-legacy headers that do not have the backward standard compatibility and in which information relating to the one or more data fields is described, and one or more non-legacy preambles that do not have the backward standard compatibility and are addressed to each of the users; and transmitting the aggregate physical layer protocol data unit in a wireless manner.

It should be noted that general or specific aspects hereof may be realized by a device, a system, a method, an integrated circuit, a computer program, or a recording medium, and may be realized by an arbitrary combination of a system, a device, a method, an integrated circuit, a computer program, and a recording medium.

According to the present disclosure, it is possible to maintain backward compatibility with the IEEE 802.11ad standard (including backward compatibility with IEEE 802.11 WLAN), and to improve the data transmission speed of an entire network.

Additional benefits and advantages in an aspect of the present disclosure will be made apparent from the specification and figures. The benefits and/or advantages may each be provided by several of the embodiments and the features disclosed in the specification and figures, and need not all be provided in order to obtain one or more of the same features.

BRIEF DESCRIPTION OF DRAWINGS

FIG. 2 depicts an example of the configuration of a legacy header.

FIG. 6 depicts an example of the configuration of a legacy header of a non-legacy MU A-PPDU in embodiment 1.

FIG. 17 depicts an example of the configuration of a legacy header of a non-legacy MU A-PPDU in embodiment 2.

FIG. 24 depicts another example of the configuration of a non-legacy header C in embodiment 2.

DESCRIPTION OF EMBODIMENTS

Hereinafter, embodiments of the present disclosure will be described in detail with reference to the drawings. First, a description will be given regarding an overview of the IEEE 802.11ad standard described in NPL 1 that serves as a premise for the embodiments of the present disclosure. It should be noted that in order to clarify the distinction between the technology stipulated in the IEEE 802.11ad standard and the millimeter wave band wireless communication technology according to the present disclosure, the word "legacy" has been added, as appropriate, to the terms relating to the IEEE 802.11ad standard.

(Overview of IEEE 802.11ad Standard)

The IEEE 802.11ad standard is able to provide PHY (physical layer) data transmission speeds of 6.7 G bps at maximum by means of a bandwidth of 2.16 GHz.

Figure 1:
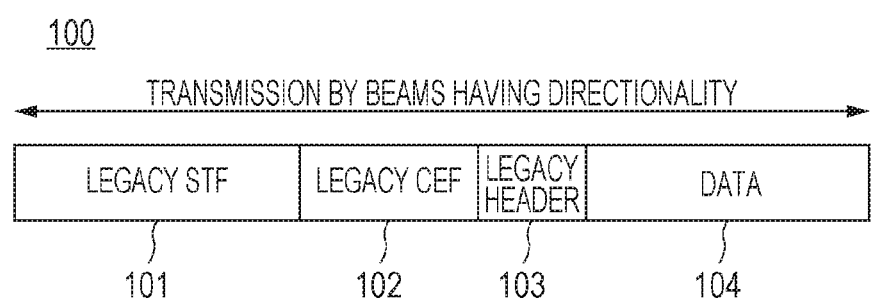
FIG. 1 depicts an example of the format of a legacy PPDU.

FIG. 1 is a drawing depicting an example of the format of a legacy PPDU. A legacy PPDU 100 as depicted in FIG. 1 has a legacy STF 101, a legacy CEF 102, a legacy header 103, and a data field 104. It should be noted that the legacy PPDU 100 is transmitted by means of a beam having directionality that is controlled by means of beamforming.

The legacy STF 101 is a field that is used for packet detection, automatic gain control (AGC), frequency offset estimation, synchronization, and the like.

The legacy CEF 102 is a field that is used for channel estimation.

The legacy header 103 has a plurality of fields, and various types of information relating to the details of the legacy PPDU 100 are described in the plurality of fields. The details of the configuration of the legacy header 103 will be described later on.

The data field 104 includes payload data of a physical layer service data unit (hereinafter, referred to as "PSDU").

FIG. 2 is a drawing depicting an example of the configuration of the legacy header 103. As depicted in FIG. 2, the legacy header 103 has a scrambler initialization field 103a, an MCS field 103b, a length field 103c, an additional PPDU field 103d, a packet type field 103e, a training length field 103f, an aggregation field 103g, a beam tracking request field 103h, a last RSSI field 103i, a turnaround field 103j, reserved bits 103k, and an HCS field 103l.

The length field 103c of the legacy header 103 designates the data size in a PSDU as a number of octets, for example. Furthermore, the additional PPDU field 103d of the legacy header 103 is set to "1" in the case where another legacy PPDU is aggregated immediately after the legacy PPDU 100, in other words, when an A-PPDU is used.

Figure 3:
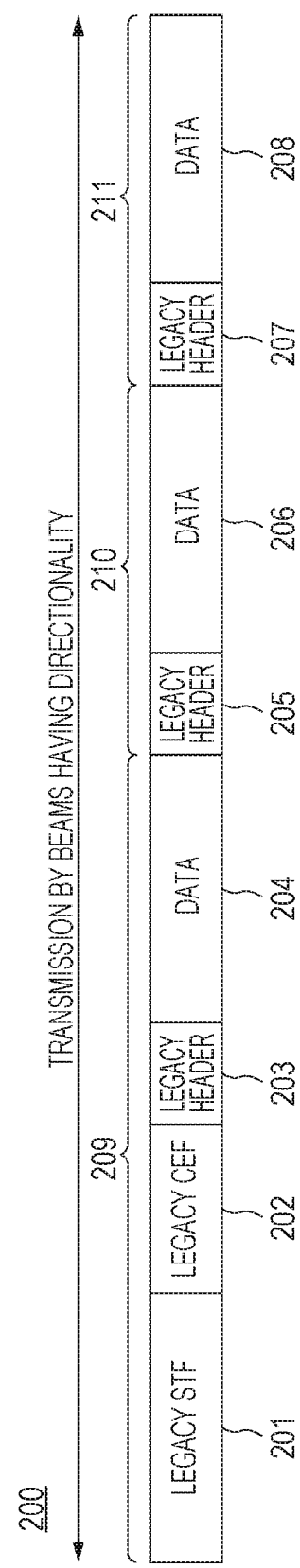
FIG. 3 depicts an example of the format of a legacy A-PPDU.

FIG. 3 is a drawing depicting an example of the format of a legacy A-PPDU. As depicted in FIG. 3, a legacy A-PPDU 200 includes three legacy PPDUs 209, 210, and 211. The legacy PPDUs 209, 210, and 211 of the legacy A-PPDU 200 respectively include legacy headers 203, 205, and 207 and data fields 204, 206, and 208. In addition, the leading (first) PPDU 209 of the legacy A-PPDU 200 includes a legacy STF 201 and a legacy CEF 202. The legacy A-PPDU 200 does not include an IFS (interframe space), which is a frame interval, and a preamble between the transmitted PPDUs.

A wireless communication device corresponding to IEEE 802.11ad (hereinafter, referred to as a "legacy device") generates the legacy A-PPDU 200 in the format depicted in FIG. 3, by adding a legacy preamble (the legacy STF and the legacy CEF) and a legacy header before the payload data of the PSDU to be transmitted, and, in addition, repeatedly aggregating legacy headers and payload data. Also, the legacy device carries out transmission processing such as scrambling, channel encoding, modulation, frequency conversion, and antenna pattern switching with respect to the generated legacy A-PPDU 200, and outputs from an antenna.

Furthermore, the legacy A-PPDU 200 is to be transmitted to one STA, and is therefore transmitted by means of a beam having directionality controlled by means of beamforming in a manner similar to the legacy PPDU 100 of FIG. 1. It should be noted that in the case where the legacy A-PPDU 200 is to be sequentially transmitted to a plurality of STAs, the legacy A-PPDU 200 is transmitted with an IFS being provided for each STA.

(Configuration of Transmission Device of Legacy Device)

Figure 4:
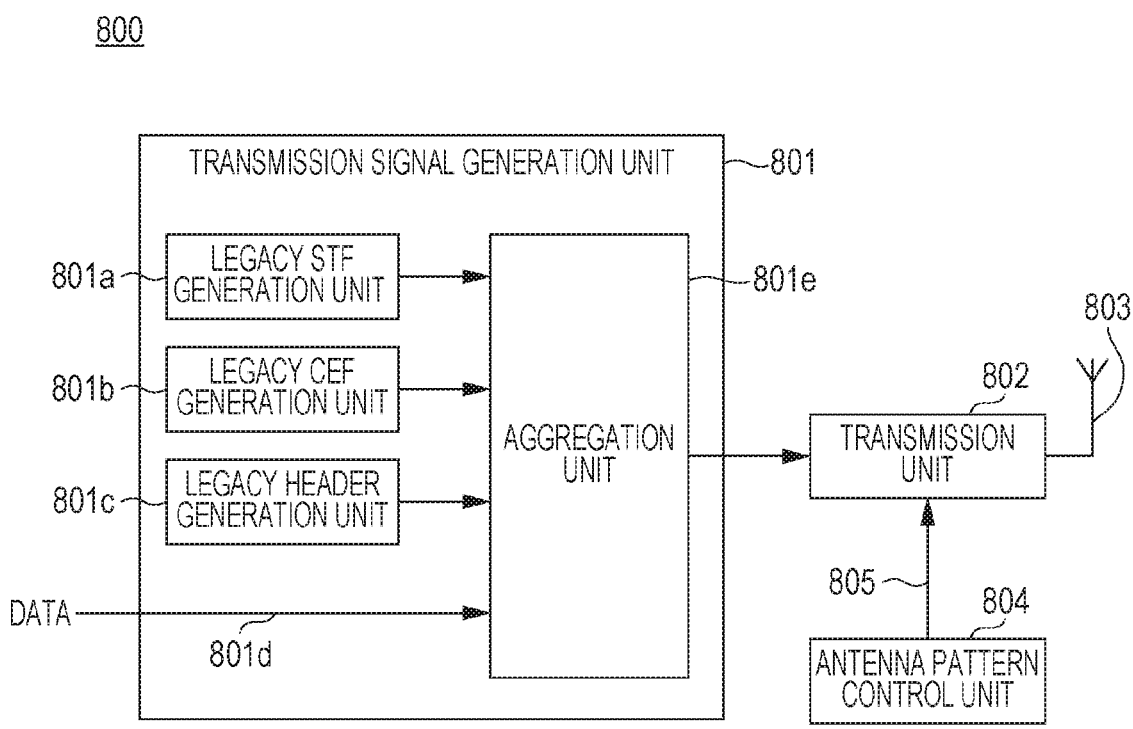
FIG. 4 depicts an example of the configuration of a transmission device of a legacy device.

FIG. 4 is a block diagram depicting an example of the configuration of a transmission device of the legacy device. As depicted in FIG. 4, a transmission device 800 of the legacy device is provided with a transmission signal generation unit 801, a transmission unit 802, an antenna 803, and an antenna pattern control unit 804.

The transmission signal generation unit 801 includes a legacy STF generation unit 801a, a legacy CEF generation unit 801b, a legacy header generation unit 801c, and an aggregation unit 801e.

The legacy STF generation unit 801a generates a legacy STF, the legacy CEF generation unit 801b generates a legacy CEF, and the legacy header generation unit 801c generates a legacy header.

The aggregation unit 801e generates the legacy A-PPDU 200 by aggregating the legacy STF, the legacy CEF, the legacy header, and data 801d.

The transmission unit 802 carries out transmission processing such as scrambling, channel encoding, modulation, frequency conversion, and the like with respect to the legacy A-PPDU 200. Furthermore, the transmission unit 802 carries out directionality switching processing for the antenna 803 on the basis of an antenna pattern control signal 805.

The antenna 803 wirelessly sends out the legacy A-PPDU 200 output from the transmission unit 802.

The antenna pattern control unit 804 outputs the antenna pattern control signal 805 in order to control the directionality switching of the antenna 803 in the transmission unit 802.

In this way, the transmission device 800 of the legacy device carries out transmission with predetermined transmission processing and antenna pattern switching processing being carried out with respect to the legacy A-PPDU 200.

(Overview of the Present Disclosure)

Hereinafter, a millimeter wave band wireless communication technology according to the present disclosure will be described. The millimeter wave band wireless communication technology according to the present disclosure is a technology for maintaining backward compatibility with the IEEE 802.11ad standard and improving the data transmission speed of an entire network compared to IEEE 802.11ad. In order to clarify the distinction with the IEEE 802.11ad standard, the word "non-legacy" has been added, as appropriate, to the terms relating to the millimeter wave band wireless communication technology according to the present disclosure.

The millimeter wave band wireless communication technology according to the present disclosure realizes an improvement in the data transmission speed of an entire network by allocating and transmitting PPDUs making up an A-PPDU to a plurality of different STAs.

Therefore, the millimeter wave band wireless communication technology according to the present disclosure defines a non-legacy multi-user A-PPDU (hereinafter, referred to as a "non-legacy MU A-PPDU") with which PPDUs are allocated to a plurality of different STAs and then aggregated and transmitted.

Meanwhile, backward compatibility with IEEE 802.11ad (including backward compatibility with IEEE 802.11 WLAN) is realized by means of a format provided with a legacy preamble (the legacy STF 101 and the legacy CEF 102) and the legacy header 103.

Embodiment 1

Figure 5:
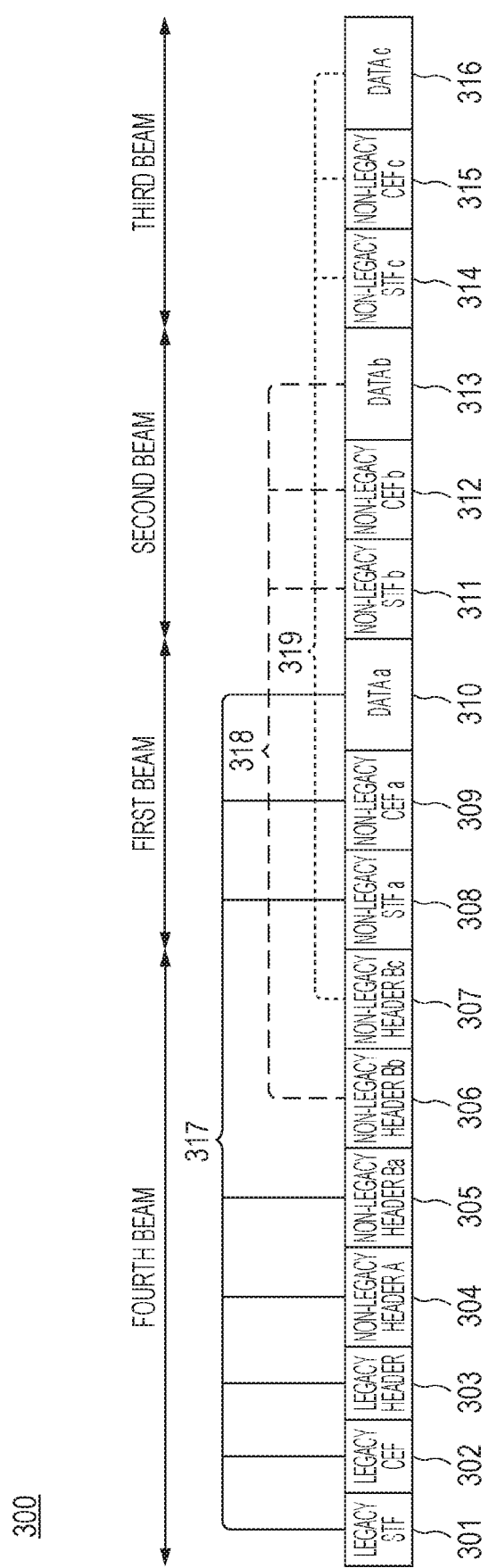
FIG. 5 depicts an example of the format of a non-legacy MU A-PPDU in embodiment 1.

FIG. 5 is a drawing depicting an example of the format of the non-legacy MU A-PPDU in the present embodiment. In FIG. 5, three non-legacy PPDUs have been aggregated. Here, the non-legacy PPDUs are allocated to three mutually different STAs (taken as an STA 1, an STA 2, and an STA 3, for example). As depicted in FIG. 5, a non-legacy MU A-PPDU 300 includes three non-legacy PPDUs 317, 318, and 319. Each non-legacy PPDU of the non-legacy MU A-PPDU 300 is configured of a non-legacy header B, a non-legacy STF (short training field), a non-legacy CEF (channel estimation field), and a data field.

In addition, the first (leading) non-legacy PPDU 317 of the non-legacy MU A-PPDU 300 includes a legacy STF 301, a legacy CEF 302, a legacy header 303, and a non-legacy header A 304, together with a non-legacy header Ba 305, a non-legacy STF a 308, a non-legacy CEF a 309, and data a 310.

It should be noted that the second non-legacy PPDU 318 is a configuration that includes a non-legacy header Bb 306, a non-legacy STF b 311, a non-legacy CEF b 312, and data b 313, and the third non-legacy PPDU 319 is a configuration that includes a non-legacy header Bc 307, a non-legacy STF c 314, a non-legacy CEF c 315, and data c 316, and do not include a legacy STF, a legacy CEF, a legacy header, or a non-legacy header A.

It should be noted that, similar to a legacy A-PPDU, an IFS constituting a frame interval is not included between the non-legacy PPDUs in the non-legacy MU A-PPDU 300; however, an IFS may be set.

The legacy STF 301 is a configuration that is similar to the legacy STF 101 in the legacy PPDU 100, and is a field that is used for at least one of packet detection, automatic gain control (AGC), frequency offset estimation, and synchronization carried out by all destination STAs for the non-legacy MU A-PPDU.

The legacy CEF 302 is a configuration that is similar to the legacy CEF 102 in the legacy PPDU 100, and is a field that is used for channel estimation carried out by all destination STAs for the non-legacy MU A-PPDU.

The legacy header 303 has a plurality of fields, and has various types of information relating to the details of the non-legacy MU A-PPDU 300 described therein. The details of the configuration of the legacy header 303 will be described later on.

The non-legacy header A 304 includes destination information of the non-legacy PPDUs making up the non-legacy MU A-PPDU 300. The details of the configuration of the non-legacy header A 304 will be described later on.

The non-legacy headers B 305, 306, and 307 include various types of information relating to the non-legacy PPDUs making up the non-legacy MU A-PPDU 300. The details of the configuration of the non-legacy headers B 305, 306, and 307 will be described later on.

The non-legacy STFs 308, 311, and 314 are fields that are used for AGC readjustment and resynchronization carried out by the destination STAs for the non-legacy PPDUs. The lengths of the non-legacy STFs 308, 311, and 314 can be made shorter than the length of the legacy STF 301.

The non-legacy CEFs 309, 312, and 315 are fields that are used for channel re-estimation carried out by the destination STAs for the non-legacy PPDUs.

The data fields 310, 313, and 316 are configured from PSDU payload data for each destination STA.

FIG. 6 is a drawing depicting an example of the format of the legacy header 303 of the non-legacy MU A-PPDU 300 in the present embodiment. As depicted in FIG. 6, the legacy header 303 has a scrambler initialization field 303a, an MCS field 303b, a length field 303c, an additional PPDU field 303d, a packet type field 303e, a training length field 303f, an aggregation field 303g, a beam tracking request field 303h, a last RSSI field 303i, a turnaround field 303j, a destination type field 303m, reserved bits 303k, and an HCS field 303l.

The destination type field 303*m* is a field that is used for a non-legacy device to distinguish between whether the destination of a non-legacy device A-PPDU is a single user (one STA) or multiple users (a plurality of STAs). The destination type field 303*m* becomes effective in the case where the aggregation field 303*g* has been set to "1", and, for example, the destination type field 303*m* is set to "0" in the case where the destination of a non-legacy A-PPDU is a single user, and is set to "1" in the case of multiple users.

Consequently, the non-legacy header A 304, the three non-legacy headers B 305, 306, and 307, the three non-legacy STFs 308, 311, and 314, and the three non-legacy CEFs 309, 312, and 315 depicted in FIG. 5 are present in the case where both the aggregation field 303*g* and the destination type field 303*m* have been set to "1".

It should be noted that the destination type field 303*m* uses some of the reserved bits 103*k* of the legacy header 103, and therefore backward compatibility with the IEEE 802.11ad standard is maintained. It should be noted that in the case where the destination of a non-legacy A-PPDU is a single user, the format of the non-legacy A-PPDU is the same as the format of a legacy A-PPDU.

Figure 7:
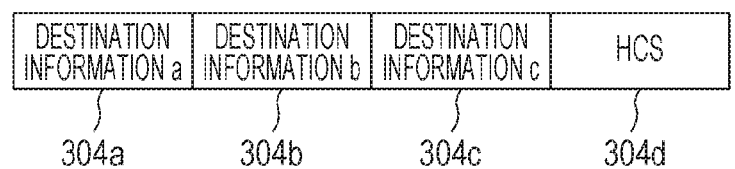
FIG. 7 depicts an example of the configuration of a non-legacy header A in embodiment 1.

FIG. 7 is a drawing depicting an example of the configuration of a non-legacy header A in the present embodiment. As depicted in FIG. 7, the non-legacy header A 304 has destination information fields 304*a*, 304*b*, and 304*c* of all of the STAs that are destinations for the non-legacy MU A-PPDU 300, and an HCS (header check sequence) field 304*d*.

Here, the destination information is a MAC address and an AID (association identifier) of a destination STA, for example. It should be noted that the arrangement order of the PPDUs making up the non-legacy MU A-PPDU 300 is the same as the arrangement order of the destination information of the non-legacy header A 304.

Figure 8:
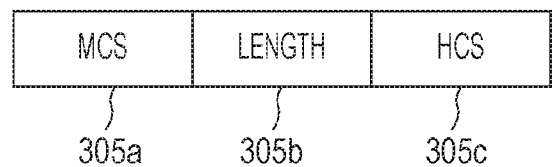
FIG. 8 depicts an example of the configuration of a non-legacy header B in embodiment 1.

FIG. 8 is a drawing depicting an example of the configuration of a non-legacy header B in the present embodiment. As depicted in FIG. 8, the non-legacy headers B 305, 306, and 307 have an MCS field 305*a* which instructs an MCS that is used in the data field allocated to each of the destination STAs, a length field 305*b* in which the size of the data field allocated to each of the destination STAs is indicated as a number of octets, and an HCS field 305*c*. It should be noted that the arrangement order of the non-legacy headers B 305, 306, and 307 in the non-legacy MU A-PPDU 300 is the same as the arrangement order of the destination information of the non-legacy header A 304.

Here, the directionality of an antenna that transmits the non-legacy MU A-PPDU will be described. In FIG. 5, the legacy STF 301 to the non-legacy header Bc 307 of the non-legacy MU A-PPDU 300 are transmitted by means of a fourth beam having directionality for arriving at all of the STAs that are destinations of the non-legacy MU A-PPDU 300.

Meanwhile, the non-legacy STF a 308 to the data a 310 are transmitted by means of a first beam having directionality controlled for the STA 1, the non-legacy STF b 311 to the data b 313 are transmitted by means of a second beam having directionality controlled for the STA 2, and the non-legacy STF c 314 to the data c 316 are transmitted by means of a third beam having directionality controlled for the STA 3. It should be noted that the directionality of the fourth beam is low compared to the directionality of the first to third beams.

A wireless communication device corresponding to the millimeter wave band wireless communication technology according to the present disclosure (hereinafter, referred to as a "non-legacy device") generates the non-legacy MU A-PPDU 300 depicted in FIG. 5, by adding a non-legacy preamble (the non-legacy STF and the non-legacy CEF) before the payload of each PSDU allocated to the plurality of STAs constituting transmission targets, carries out aggregation without providing a frame gap as an IFS, and, in addition, adds a legacy preamble (the legacy STF and the legacy CEF), a legacy header, and a non-legacy header A and non-legacy header B corresponding to each PSDU.

Also, the non-legacy device carries out transmission processing including scrambling, channel encoding, modulation, frequency conversion, and antenna pattern switching with respect to the non-legacy MU A-PPDU 300, and outputs from the antenna.

(Configuration of Transmission Device of Non-Legacy Device)

Figure 9:
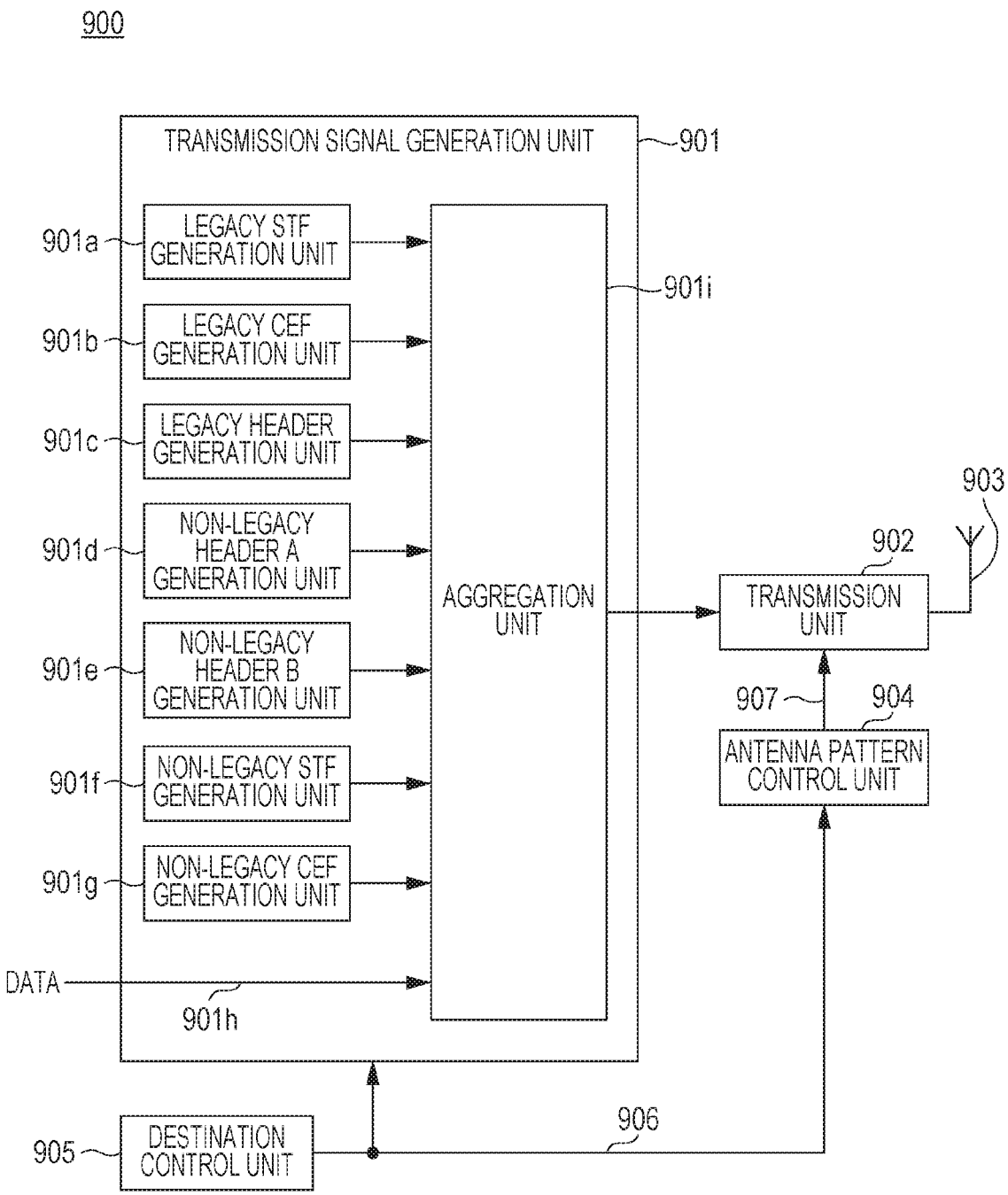
FIG. 9 depicts an example of the configuration of a transmission device of a non-legacy device in embodiment 1.

FIG. 9 is a block diagram depicting an example of the configuration of a transmission device of the non-legacy device. As depicted in FIG. 9, a transmission device 900 of the non-legacy device is provided with a transmission signal generation unit 901, a transmission unit 902, an antenna 903, an antenna pattern control unit 904, and a destination control unit 905.

The destination control unit 905 outputs a destination control signal 906 that controls the destination of the non-legacy MU A-PPDU 300. Here, the destination control signal is the number of destination STAs, MAC addresses of the destination STAs, AIDs of the destination STAs, the transmission order of the destination STAs, and switching timings of the destination STAs (boundaries of the non-legacy PPDUs making up the non-legacy MU A-PPDU), for example.

The transmission signal generation unit 901 includes a legacy STF generation unit 901*a*, a legacy CEF generation unit 901*b*, a legacy header generation unit 901*c*, a non-legacy header A generation unit 901*d*, a non-legacy header B generation unit 901*e*, a non-legacy STF generation unit 901*f*, a non-legacy CEF generation unit 901*g*, and an aggregation unit 901*i*.

In the transmission signal generation unit 901, in accordance with the destination control signal 906, the legacy STF generation unit 901*a* generates a legacy STF, the legacy CEF generation unit 901*b* generates a legacy CEF, the legacy header generation unit 901*c* generates a legacy header, the non-legacy header A generation unit 901*d* generates a non-legacy header A, the non-legacy header B generation unit 901*e* generates a non-legacy header B, the non-legacy STF generation unit 901*f* generates a non-legacy STF, and the non-legacy CEF generation unit 901*g* generates a non-legacy CEF.

In accordance with the destination control signal 906, the aggregation unit 901*i* aggregates the legacy STF, the legacy CEF, the legacy header, the non-legacy header A, the non-legacy header B, the non-legacy STF, the non-legacy CEF, and data 901*h*, thereby generating the non-legacy MU A-PPDU 300.

The transmission unit 902 carries out transmission processing including scrambling, channel encoding, modulation, and frequency conversion with respect to the non-legacy MU A-PPDU 300. Furthermore, the transmission unit 902 carries out directionality switching processing for the antenna 903 on the basis of an antenna pattern control signal 907.

The antenna 903 wirelessly sends out the non-legacy MU A-PPDU 300 output from the transmission unit 902.

The antenna pattern control unit 904 generates the antenna pattern control signal 907 on the basis of the destination control signal 906 in order to switch the directionality of the antenna 903 in the transmission unit 902 for each destination STA.

In this way, the transmission device 900 of the non-legacy device carries out transmission with predetermined transmission processing and antenna pattern switching processing corresponding to the destinations being carried out with respect to the non-legacy MU A-PPDU.

(Modified Examples of Non-Legacy MU A-PPDU)

FIGS. 10 to 14 are drawings depicting other examples of formats of the non-legacy MU A-PPDU in the present embodiment.

Figure 10:
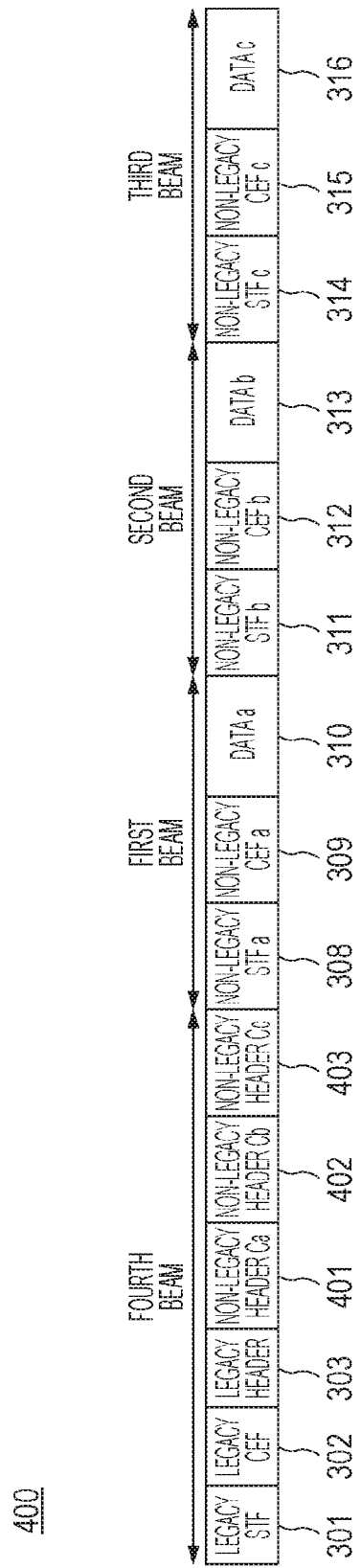
FIG. 10 depicts another example of the format of a non-legacy MU A-PPDU in embodiment 1.

A non-legacy MU A-PPDU 400 depicted in FIG. 10 is different from the non-legacy MU A-PPDU depicted in FIG. 5 in having non-legacy headers C 401, 402, and 403 instead of the non-legacy header A 304 and the non-legacy headers B 305, 306, and 307.

Figure 11:
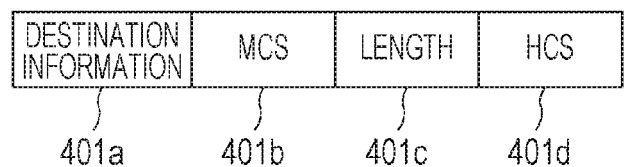
FIG. 11 depicts an example of the configuration of a non-legacy header C in embodiment 1.

Here, a non-legacy header C is a configuration in which a non-legacy header A and a non-legacy header B have been grouped together as depicted in FIG. 11.

in FIG. 10, the legacy STF 301 to a non-legacy header Cc 403 are transmitted by means of the fourth beam having directionality for arriving at all of the STAs that are destinations of the non-legacy MU A-PPDU 400. Meanwhile, the non-legacy STF a 308 to the data a 310 are transmitted by means of the first beam having directionality controlled for the STA 1, the non-legacy STF b 311 to the data b 313 are transmitted by means of the second beam having directionality controlled for the STA 2, and the non-legacy STF c 314 to the data c 316 are transmitted by means of the third beam having directionality controlled for the STA 3. The directionality of the fourth beam is low compared to the directionality of the first to third beams.

FIG. 11 is a drawing depicting an example of the configuration of the non-legacy headers C 401, 402, and 403. As depicted in FIG. 11, the non-legacy headers C 401, 402, and 403 have a destination information field 401a, an MCS field 401b, a length field 401c, and an HCS field 401d.

Figure 12:
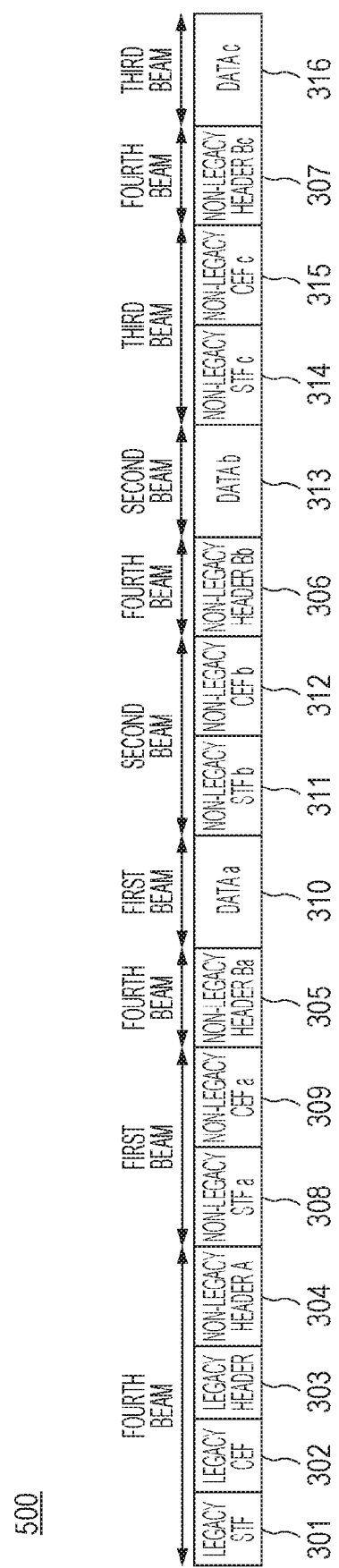
FIG. 12 depicts another example of the format of a non-legacy MU A-PPDU in embodiment 1.

A non-legacy MU A-PPDU 500 depicted in FIG. 12 is different from the non-legacy MU A-PPDU 300 of FIG. 5 in that a non-legacy header B is arranged between a non-legacy CEF and a data field allocated to each of the destination STAs.

In FIG. 12, the beams that are used to transmit the fields of the non-legacy MU A-PPDU 500 are the same as the beams depicted in FIG. 5; however, because the positions of the non-legacy headers B are different as previously mentioned, it is necessary for the beams to be switched frequently compared to the case where the non-legacy MU A-PPDU 300 depicted in FIG. 5 is transmitted.

Figure 13:
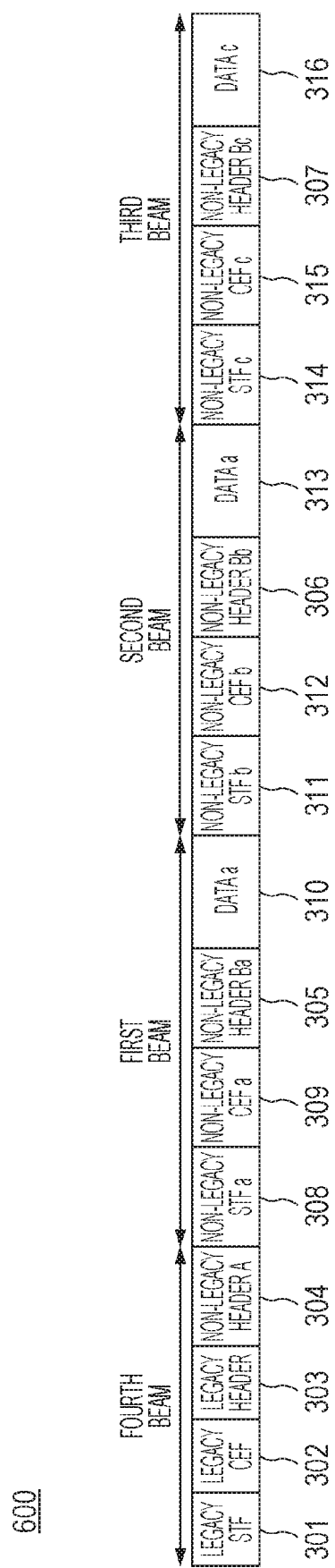
FIG. 13 depicts another example of the format of a non-legacy MU A-PPDU in embodiment 1.

A non-legacy MU A-PPDU 600 depicted in FIG. 13 has the same configuration as the non-legacy MU A-PPDU 500 depicted in FIG. 12, but the beams that are used to transmit the non-legacy headers B are different. In the case where the non-legacy MU A-PPDU 600 is transmitted, the transmission device does not transmit non-legacy headers B using the fourth beam, and therefore non-legacy headers B in which the data sizes of the non-legacy PPDUs are described do not reach anything other than the respective destination STAs. It is therefore necessary for other destination STAs to carry out packet re-detection by means of a non-legacy STF.

Figure 14:
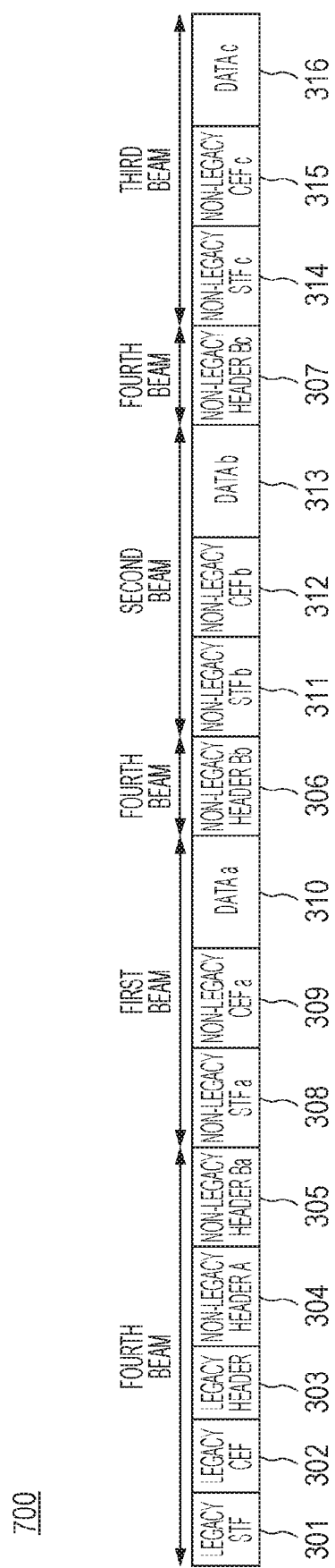
FIG. 14 depicts another example of the format of a non-legacy MU A-PPDU in embodiment 1.

A non-legacy MU A-PPDU 700 depicted in FIG. 14 is different from the non-legacy MU A-PPDU 300 of FIG. 5 in that a non-legacy header B is arranged immediately preceding a non-legacy STF allocated to each of the destination STAs.

It should be noted that, in FIG. 14, the beams that are used to transmit the fields of the non-legacy MU A-PPDU 700 are the same as the beams depicted in FIG. 5; however, in the non-legacy MU A-PPDU 700, because the positions of the non-legacy headers B are different as previously mentioned, it is necessary for the beams to be switched frequently compared to the case where the non-legacy MU A-PPDU 300 depicted in FIG. 5 is transmitted.

It should be noted that the destination STAs receive a non-legacy header B without carrying out by resynchronization by means of a non-legacy STF; therefore, the probability of an HCS error in a non-legacy header B may become higher than with the non-legacy MU A-PPDU 300 of FIG. 5.

As mentioned above, the wireless communication device according to the present embodiment can generate and transmit a non-legacy MU A-PPDU. Consequently, the wireless communication device according to the present embodiment can maintain backward compatibility with the IEEE 802.11ad standard, and, in addition, due to an IFS not being provided between non-legacy PPDUs for each destination STA, and due to using a non-legacy preamble that is shorter than a legacy preamble, the data transmission speed of an entire network can be improved compared to the case where a legacy A-PPDU is sequentially transmitted to a plurality of different STAs.

Embodiment 2

In the present embodiment, a description will be given regarding a wireless communication device that generates and transmits a non-legacy MU A-PPDU having a configuration that is different from that in embodiment 1. It should be noted that the portions that are different from embodiment 1 will be described, and duplicate portions will not be described.

Figure 15:
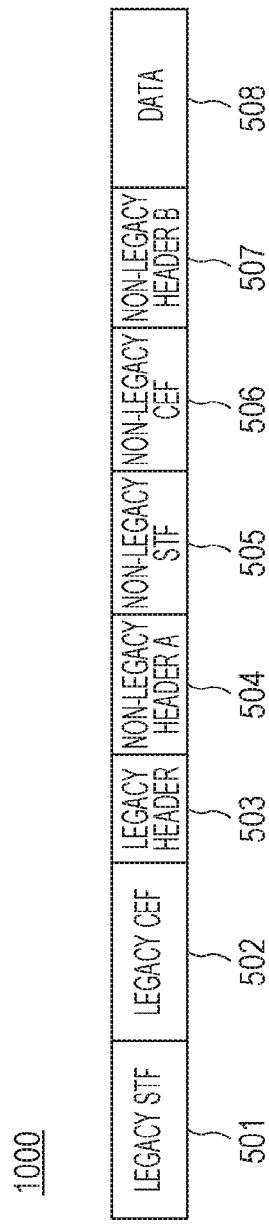
FIG. 15 depicts an example of the format of a non-legacy PPDU in embodiment 2.

FIG. 15 is a drawing depicting an example of the format of a non-legacy MU A-PPDU in the present embodiment. As depicted in FIG. 15, a non-legacy PPDU 1000 has a legacy STF 501, a legacy CEF 502, a legacy header 503, a non-legacy header A 504, a non-legacy STF 505, a non-legacy CEF 506, a non-legacy header B 507, and a data field 508.

The legacy STF 501, similar to the legacy STF 101 in the legacy PPDU 100, is a field that is used for at least one of packet detection, automatic gain control (AGC), frequency offset estimation, and synchronization.

The legacy CEF 502, similar to the legacy CEF 102 in the legacy PPDU 100, is a field that is used for channel estimation.

The legacy header 503 has almost the same configuration as the legacy header 103 in the legacy PPDU 100 except that a field or the like for distinguishing a non-legacy PPDU from a legacy PPDU has been added. The details of the configuration of the legacy header 503 will be described later on.

Various types of information relating to the details of the non-legacy PPDU 1000 are described in the non-legacy header A 504 and the non-legacy header B 507. The details of the configuration of the non-legacy header A 504 and the non-legacy header B 507 will be described later on.

The non-legacy STF 505 is a field that is used for AGC readjustment and resynchronization when a channel bonding technology or MIMO technology is used, but is also used in the non-legacy MU A-PPDU in the present embodiment for AGC readjustment and resynchronization carried out by destination STAs for non-legacy PPDUs. The length of the non-legacy STF 505 can be made shorter than the length of the legacy STF 501.

The non-legacy CEF 506 is a field that is used for channel re-estimation when a channel bonding technology or MIMO technology is used, but is also used in the non-legacy MU A-PPDU in the present embodiment for channel re-estimation carried out by destination STAs for non-legacy PPDUs.

The data field 508 includes PSDU payload data.

Figure 16:
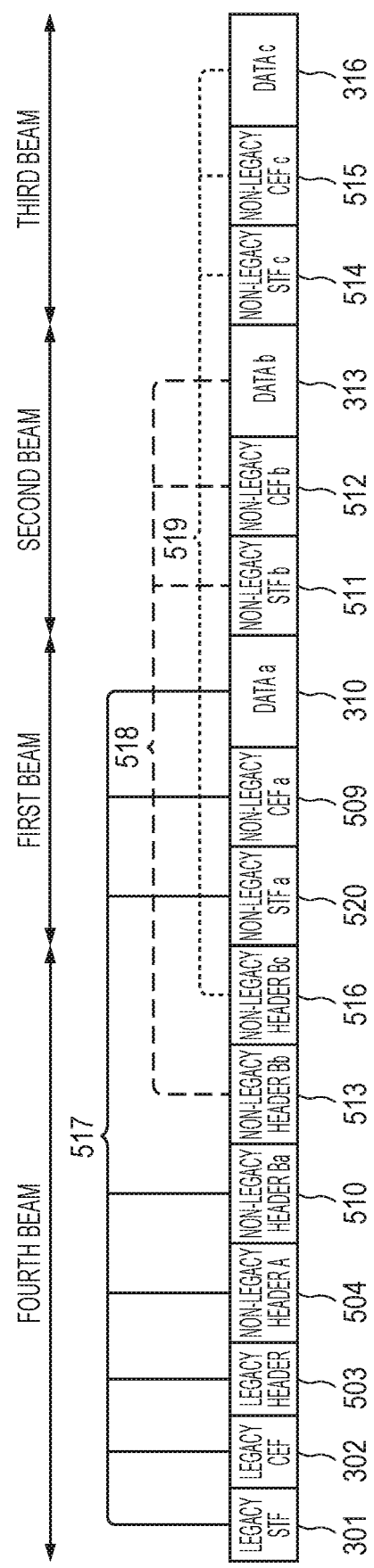
FIG. 16 depicts an example of the format of a non-legacy MU A-PPDU in embodiment 2.

FIG. 16 is a drawing depicting an example of the format of the non-legacy MU A-PPDU in the present embodiment. In FIG. 16, three non-legacy PPDUs have been aggregated. Here, the non-legacy PPDUs are allocated to three mutually different STAs (taken as an STA 1, an STA 2, and an STA 3, for example). As depicted in FIG. 16, a non-legacy MU A-PPDU 300-1 includes three non-legacy PPDUs 517, 518, and 519. Each non-legacy PPDU of the non-legacy MU A-PPDU 300-1 is configured of a non-legacy header B, a non-legacy STF (short training field), a non-legacy CEF (channel estimation field), and a data field.

In addition, the first (leading) non-legacy PPDU 517 of the non-legacy MU A-PPDU 300-1 includes the legacy STF 301, the legacy CEF 302, the legacy header 503, and the non-legacy header A 504, together with a non-legacy header Ba 510, a non-legacy STF a 520, a non-legacy CEF a 509, and the data a 310.

It should be noted that the second non-legacy PPDU 518 and the third non-legacy PPDU 519 do not include a legacy STF, a legacy CEF, a legacy header, or a non-legacy header A.

It should be noted that, similar to a legacy A-PPDU, an IFS constituting a frame interval is not included between the non-legacy PPDUs in the non-legacy MU A-PPDU 300-1; however, an IFS may be set.

The legacy STF 301 is a configuration that is similar to the legacy STF 101 in the legacy PPDU 100, and is a field that is used for at least one of packet detection, automatic gain control (AGC), frequency offset estimation, and synchronization carried out by all destination STAs for the non-legacy MU A-PPDU.

The legacy CEF 302 is a configuration that is similar to the legacy CEF 102 in the legacy PPDU 100, and is a field that is used for channel estimation carried out by all destination STAs for the non-legacy MU A-PPDU.

The legacy header 503 has the same configuration as the legacy header 503 of FIG. 15.

The non-legacy header A 504 has the same configuration as the non-legacy header A 504 of FIG. 15, and includes destination information of the non-legacy PPDUs making up the non-legacy MU A-PPDU 300-1. The details of the configuration of the non-legacy header A 504 will be described later on.

The non-legacy headers B 510, 513, and 516 have the same configuration as the non-legacy header B 507 of FIG. 15, and include various types of information relating to the non-legacy PPDUs making up the non-legacy MU A-PPDU 300-1. The details of the configuration of the non-legacy headers B 510, 513, and 516 will be described later on.

The non-legacy STFs 520, 511, and 514 have the same configuration as the non-legacy STF 505 of FIG. 15, and are fields that are used for AGC readjustment and resynchronization carried out by the destination STAs for the non-legacy PPDUs. The lengths of the non-legacy STFs 520, 511, and 514 can be made shorter than the length of the legacy STF 301.

The non-legacy CEFs 509, 512, and 515 have the same configuration as the non-legacy CEF 506 of FIG. 15, and are fields that are used for channel re-estimation carried out by the destination STAs for the non-legacy PPDUs.

The data fields 310, 313, and 316 are configured from PSDU payload data for each destination STA.

FIG. 17 is a drawing depicting an example of the format of the legacy header 503 of the non-legacy MU A-PPDU 300-1 in the present embodiment. As depicted in FIG. 17, in the legacy header 503, a non-legacy indication field 503n has been added at a stage subsequent to the turnaround field 303j with respect to the legacy header 303 of FIG. 6.

It should be noted that the roles of the fields excluding the non-legacy indication field 503n and a destination type field 503m are the same as those of the legacy header 103 in the legacy PPDU 100, and therefore descriptions here have been omitted.

The non-legacy indication field 503n is a field that is used for designating whether each PPDU is a legacy PPDU or a non-legacy PPDU. For example, a PPDU is a legacy PPDU in the case where the non-legacy indication field 503n is "0", and a non-legacy PPDU in the case of "1".

The destination type field 503m is a field that is used for designating whether the destination of an aggregated non-legacy PPDU is a single user (one STA) or multiple users (a plurality of STAs). The destination type field 503m becomes effective in the case where the non-legacy indication field 503n has been set to "1", and, for example, the destination type field 503m is set to "0" in the case where the destination of an aggregated non-legacy PPDU is a single user, and is set to "1" in the case of multiple users.

Consequently, in the case where the non-legacy MU A-PPDU 300-1 depicted in FIG. 16 is configured, the non-legacy indication field 503n is set to "1" and the destination type field 503m is set to "1".

Furthermore, since the legacy device is not able to receive and demodulate the non-legacy MU A-PPDU 300-1, the additional PPDU field 303d is set to "0" in order for the non-legacy MU A-PPDU 300-1 to be regarded as the legacy PPDU 100 by the legacy device. Therefore, whether or not a non-legacy PPDU has been aggregated is designated by means of a non-legacy header B described later on.

It should be noted that the non-legacy indication field 503n and the destination type field 503m use some of the reserved bits 103k of the legacy header 103, and therefore backward compatibility with the IEEE 802.11ad standard is maintained.

Figure 18:
FIG. 18 depicts an example of the configuration of a non-legacy header A in embodiment 2.

FIG. 18 is a drawing depicting another example of the configuration of a non-legacy header A in the present embodiment. The non-legacy header A 504 is a configuration in which a BW field 504e has been added to the non-legacy header A 304 of FIG. 7.

The BW field 504e is a field that designates the bandwidth of a channel used by the non-legacy PPDUs 517, 518, and 519, and is used in the case where channel bonding is to be carried out.

It should be noted that it is also possible for the destination type field 503m to be arranged at the head of the non-legacy header A 504 instead of the legacy header 503.

Figure 19:
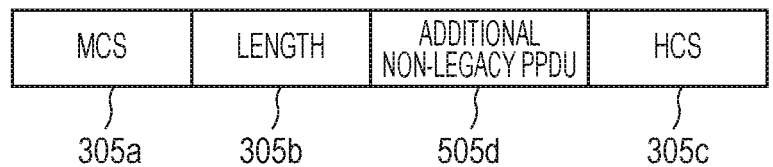
FIG. 19 depicts an example of the configuration of a non-legacy header B in embodiment 2.

FIG. 19 is a drawing depicting another example of the configuration of a non-legacy header B in the present embodiment 2. The non-legacy headers B 510, 513, and 516 depicted in FIG. 19 are configurations in which an additional non-legacy PPDU field 505d indicating that a non-legacy PPDU has been aggregated is added to the non-legacy headers B 305, 306, and 307 of FIG. 8.

The non-legacy headers B 510, 513, and 516 of FIG. 19 have: the MCS field 305a, which instructs an MCS that is used in a data field allocated to the destination STAs of the non-legacy PPDUs 517, 518, and 519; the length field 305b, in which the size of the data field allocated to each of the destination STAs is indicated as a number of octets; the additional non-legacy PPDU field 505d, which indicates that a non-legacy PPDU has been aggregated; and the HCS field 305c.

In the case where the non-legacy MU A-PPDU 300-1 depicted in FIG. 16 is configured, the additional non-legacy PPDU field 505d of the non-legacy header Ba 510 and the non-legacy header Bb 513 is set to "1"; however, the additional non-legacy PPDU field 505d of the last non-legacy header Bc 516 is set to "0". It should be noted that the arrangement order of the non-legacy headers B 510, 513, and 516 in the non-legacy MU A-PPDU 300-1 is the same as the arrangement order of the destination information of the non-legacy header A 304.

Here, the number of aggregated non-legacy PPDUs 1000 in the non-legacy MU A-PPDU 300-1 will be described. In IEEE 802.11ad, it is determined that the channel occupancy period of the legacy A-PPDU 200 is not to exceed 2 milliseconds.

For example, in the case where PPDUs having a PSDU length of 4096 octets are to be aggregated and transmitted by means of MCS2, a maximum of 46 legacy PPDUs can be aggregated. Likewise, assuming that the channel occupancy period of the non-legacy MU A-PPDU 300-1 is also not to exceed 2 milliseconds, in the case where non-legacy PPDUs 1000 having a length of 4096 octets are to be aggregated and transmitted by means of MCS2, the maximum number of aggregated non-legacy PPDUs 1000 is 46 or less.

It should be noted that the number of aggregated legacy PPDUs in the legacy A-PPDU 200 is not decided at the point in time at which transmission of the legacy A-PPDU 200 is started. Therefore, a legacy PPDU can be aggregated every time when a new legacy PPDU has been added before transmission of the final legacy PPDU. That is, the channel occupancy period of the legacy A-PPDU is extended each time a legacy PPDU is aggregated.

A similar aggregation method can be applied also for the non-legacy MU A-PPDU 300-1. However, because the legacy device is able to receive and demodulate the legacy header but is not able to receive and demodulate the non-legacy header B 507, it is difficult for the legacy device to know whether or not the non-legacy PPDU 1000 has been newly aggregated to the non-legacy MU A-PPDU 300-1 and whether or not the occupancy period has been extended. Therefore, there is a possibility that the non-legacy MU A-PPDU 300-1 produced by a non-legacy AP may collide with transmission data of the legacy device.

Figure 20:
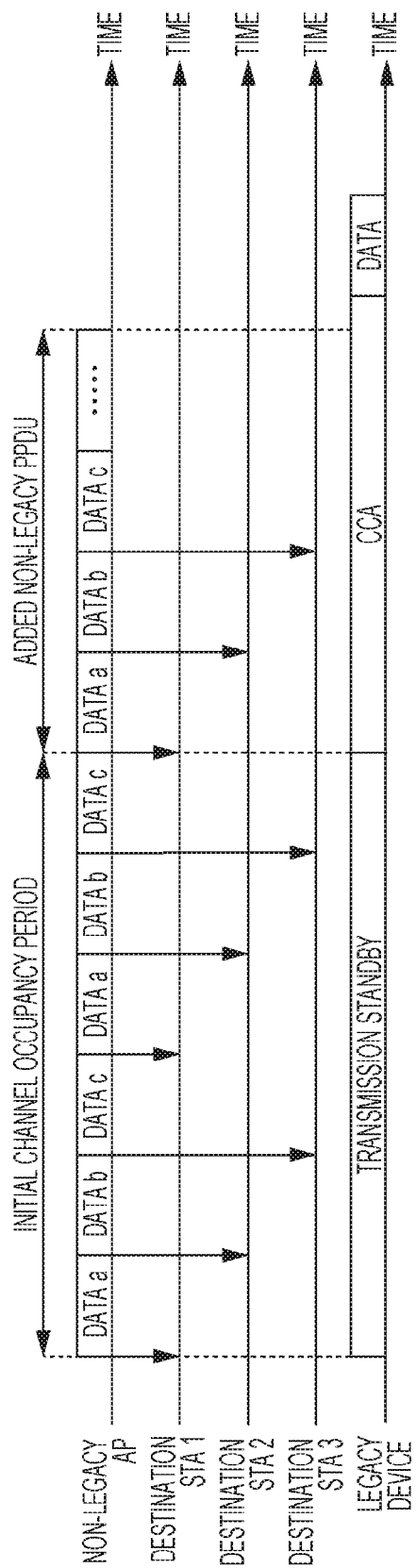
FIG. 20 depicts an example of a transmission method for a non-legacy MU A-PPDU in embodiment 2.

There is a method such as the following as a method for allowing the legacy device to know the channel occupancy period of the non-legacy MU A-PPDU 300-1. FIG. 20 is a drawing depicting an example of a transmission method for a non-legacy MU A-PPDU. The horizontal axis indicates time.

For example, in FIG. 20, the non-legacy AP calculates an initial channel occupancy period of the non-legacy MU A-PPDU 300-1 from the PSDU length of the non-legacy PPDUs 1000 and the number of aggregated non-legacy PPDUs 1000 known at the point in time at which transmission of the non-legacy MU A-PPDU 300-1 is started, sets the MCS field and length field of the legacy header 503 on the basis of the initial channel occupancy period, and transmits the non-legacy MU A-PPDU 300-1.

First, the legacy device calculates the initial channel occupancy period from the MCS field 303b and length field 303c of the legacy header 503 of the non-legacy MU A-PPDU 300-1, and waits for transmission during the calculated initial channel occupancy period.

Next, in the case where a non-legacy PPDU 1000 is newly aggregated (added) after transmission of the non-legacy MU A-PPDU 300-1 and the channel occupancy period after the aggregation/adding for the non-legacy MU A-PPDU 300-1 has become longer than the initial channel occupancy period, the legacy device executes a CCA (clear channel assessment) determined in IEEE 802.11ad after the initial channel occupancy period and assesses the channel state.

Next, as a result of the CCA, in the case where the channel is open, the legacy device transmits data. It should be noted that the non-legacy AP transmits the data fields of the non-legacy MU A-PPDU by means of directionality-controlled beams.

Therefore, there is a possibility of not being detected in the CCA carried out by the legacy device, and there are cases where transmission carried out by the non-legacy AP and transmission carried out by the legacy device are both present, but there remains a possibility of a collision between the non-legacy MU A-PPDU produced by the non-legacy AP and transmission data produced by the legacy device.

Figure 21:
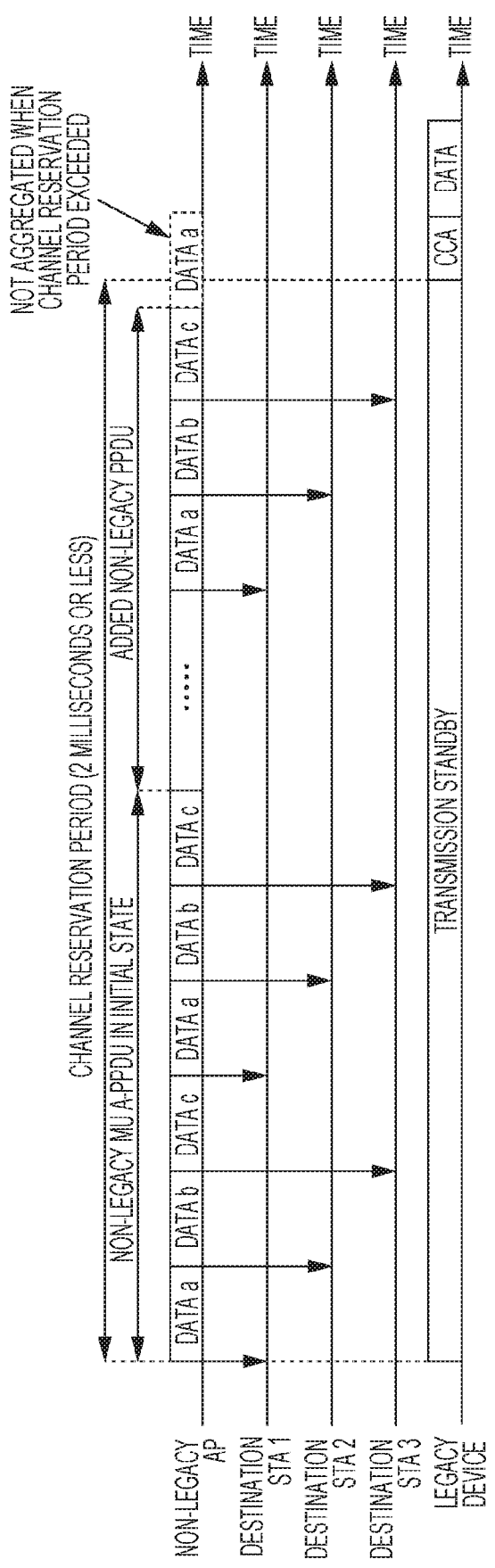
FIG. 21 depicts another example of a transmission method for a non-legacy MU A-PPDU in embodiment 2.
Figure 22:
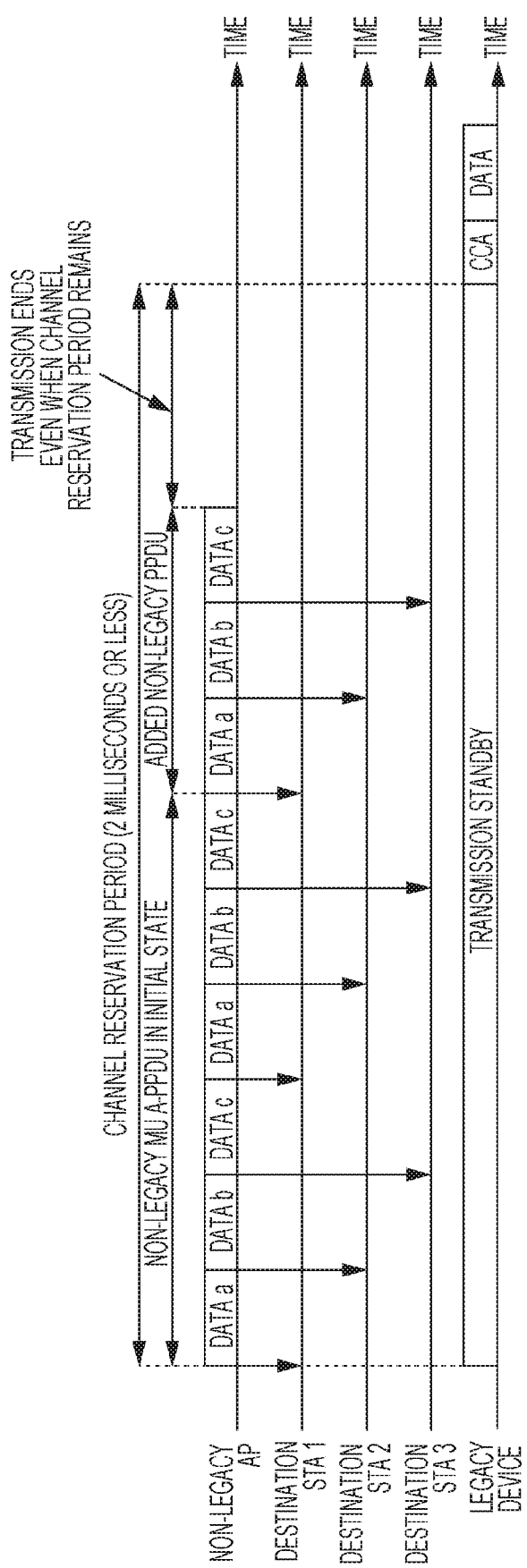
FIG. 22 depicts another example of a transmission method for a non-legacy MU A-PPDU in embodiment 2.

As a separate method, another example of a transmission method for a non-legacy MU A-PPDU is depicted in FIGS. 21 and 22.

In FIG. 21, the non-legacy AP sets the channel occupancy period of the non-legacy MU A-PPDU 300-1 within the range of 2 milliseconds or less (hereinafter, referred to as a "channel reservation period"), sets the MCS field 303b and the length field 303c of the legacy header 503 on the basis of the channel reservation period, and transmits the non-legacy MU A-PPDU 300-1.

The non-legacy AP does not aggregate (add) a new non-legacy PPDU 1000 in the case where the channel reservation period is exceeded.

Furthermore, as depicted in FIG. 22, in the case where there is no non-legacy PPDU 1000 to be newly aggregated, the non-legacy AP ends transmission of the non-legacy MU A-PPDU 300-1 even if the channel reservation period has not been reached.

The legacy device calculates the channel reservation period from the MCS field 303b and the length field 303c of the legacy header 503 of the non-legacy MU A-PPDU 300-1, and waits for transmission during the calculated channel reservation period.

Next, in the case where the channel reservation period has ended and then a CCA is carried out and a channel is open, the legacy device can transmit data. It is thereby possible to prevent a collision between the non-legacy MU A-PPDU 300-1 produced by the non-legacy AP and transmission data of the legacy device.

It should be noted that, in FIG. 20, the legacy device transmits the CCA before transmission of the non-legacy AP ends, and therefore the probability of the channel being empty is low. Consequently, there is a possibility that the CCA period for the legacy device may lengthen. Contrastingly, in FIGS. 21 and 22, the legacy device transmits the CCA after transmission of the non-legacy AP has ended, and therefore the probability of the channel being empty is high. Consequently, there is a high possibility of it being possible to shorten the CCA period for the legacy device, and the power consumption of the legacy device caused by the CCA can be reduced.

(Modified Examples of Non-Legacy MU A-PPDU)

Figure 23:
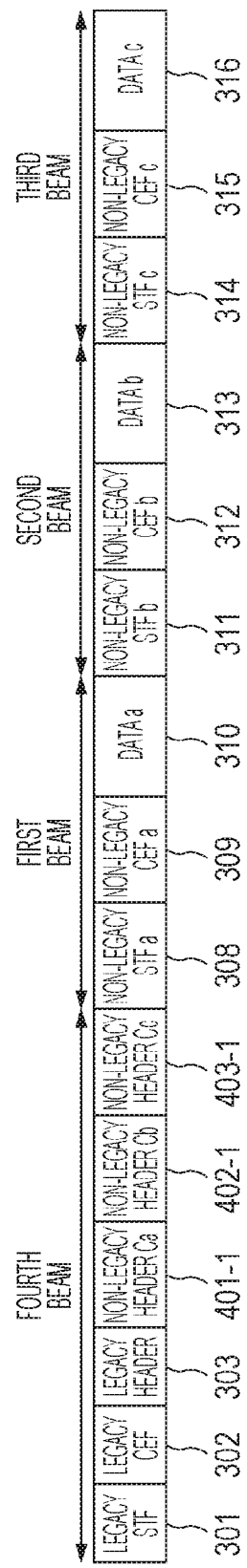
FIG. 23 depicts another example of the format of a non-legacy MU A-PPDU in embodiment 2.

FIG. 23 is a drawing depicting another example of the format of a non-legacy MU A-PPDU. FIG. 23 is a format in which the non-legacy PPDU 1000 of FIG. 15 has been applied to the non-legacy MU A-PPDU 400 depicted in FIG. 10. A non-legacy MU A-PPDU 400-1 depicted in FIG. 23 is different from the non-legacy MU A-PPDU 300-1 depicted in FIG. 16 in having non-legacy headers C 401-1, 402-1, and 403-1 instead of the non-legacy header A 504 and the non-legacy headers B 510, 513, and 516.

Here, the non-legacy headers C 401-1, 402-1, and 403-1 are configurations in which the non-legacy header A 504 and the non-legacy headers B 510, 513, and 516 have been grouped together as depicted in FIG. 24.

FIG. 24 is a drawing depicting an example of the configuration of the non-legacy headers C 401-1, 402-1, and 403-1. As depicted in FIG. 24, in the non-legacy headers C 401-1, 402-1, and 403-1, an additional non-legacy PPDU field 401e has been added at the stage subsequent to the length field 401c with respect to the non-legacy headers C 401, 402, and 403 of FIG. 11.

By adding the additional non-legacy PPDU field 401e, in FIG. 24, similar to FIG. 16, even in the case where a non-legacy PPDU 1000 has been aggregated and the occupancy period has been extended, it is possible to avoid a collision between the non-legacy MU A-PPDU 300-1 produced by the non-legacy AP and transmission data of the legacy device.

Figure 25:
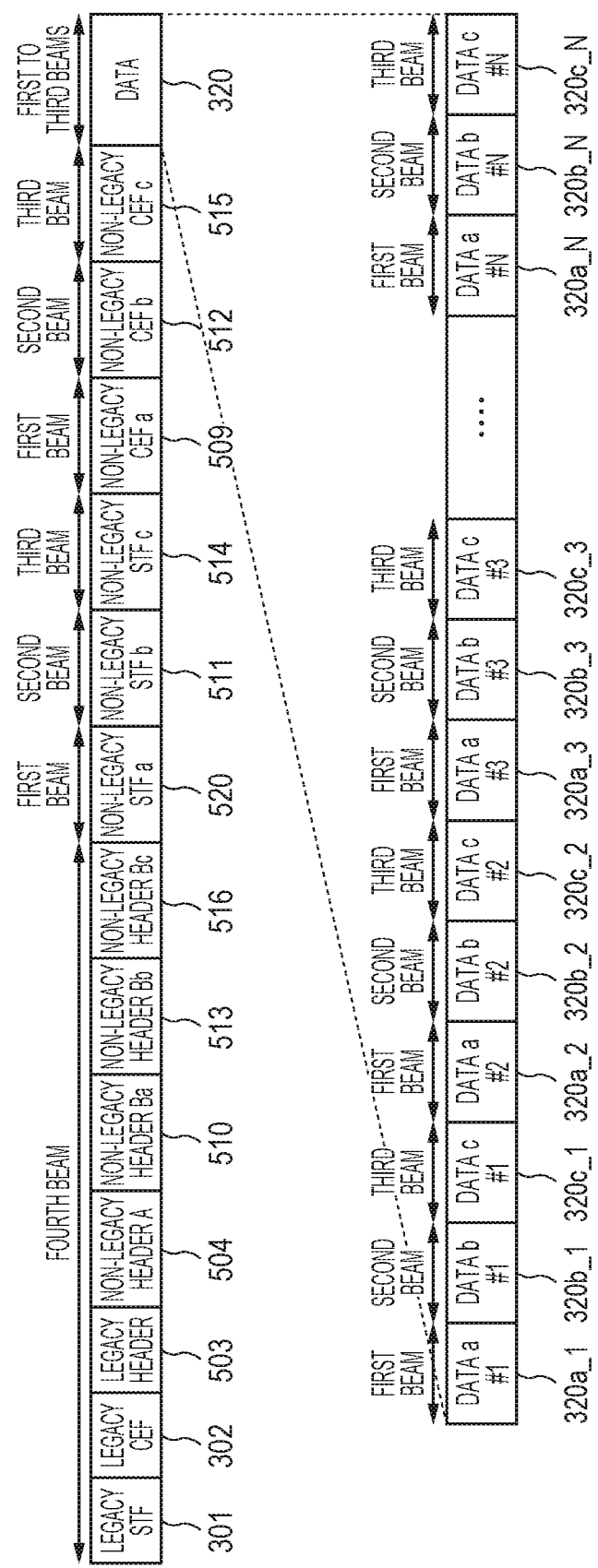
FIG. 25 depicts another example of the format of a non-legacy MU A-PPDU in embodiment 2.

FIG. 25 is a drawing depicting another example of the format of a non-legacy MU A-PPDU.

There is a possibility that a non-legacy STA may be out of synchronization in the case where a signal has not been received for a long period of time due to the length of the data fields of a non-legacy MU A-PPDU. A non-legacy MU A-PPDU 300-2 depicted in FIG. 25 is an example of the format of a non-legacy MU A-PPDU corresponding to a loss of synchronization. In the non-legacy MU A-PPDU 300-2, the fields making up non-legacy PPDUs are interleaved among non-legacy PPDUs having different destinations, and are transmitted while switching beams at high speed for each item of data 320.

An AP and STA, in a single carrier PHY of IEEE 802.11ad, carry out transmission in SC block units of 512 symbols in which 448-symbol data and a 64-symbol guard interval are implemented as a set, and in an OFDM PHY, carry out transmission in 512 OFDM symbol units. Consequently, for the data 320, interleaving is carried out in SC block units or OFDM symbol units. By doing so, signals reach all of the destination STAs in an equal manner, and loss of synchronization can be prevented.

Here, a switching period for the first beam, second beam, and third beam will be described. The symbol rate in a single carrier PHY of IEEE 802.11ad is assumed to be 1.76 G symbol/sec. Furthermore, the frequency error tolerance of receiver-transmitters of an AP and STA is assumed to be ±20 ppm with respect to a reference frequency, and therefore a frequency deviation between receiver-transmitters is 40 ppm at most.

Loss of synchronization occurs when timings deviate by ½ symbol or more, and therefore, in the case where there is a frequency deviation of 40 ppm between receiver-transmitters and signals are not received for approximately 7 microseconds (non-reception period), a loss of synchronization occurs in the AP.

Beam switching periods are obtained by dividing the non-reception period by the number of users (number of destination STAs). For example, assuming that there are three users, a beam switching period is approximately 2.4 microseconds. That is, in FIG. 25, the AP carries out transmission at intervals of approximately 2.4 microseconds or less for each item of data, with an interval from data a #1 (320a_1) to data a #2 (320a_2) being approximately 7 microseconds, and each destination STA can thereby avoid loss of synchronization.

As mentioned above, the wireless communication device according to the present embodiment can generate and transmit a non-legacy MU A-PPDU. Consequently, the wireless communication device according to the present embodiment can maintain backward compatibility with the IEEE 802.11ad standard, and, in addition, due to an IFS not being provided between non-legacy PPDUs for each destination STA, and due to using a non-legacy preamble that is shorter than a legacy preamble, the data transmission speed of an entire network can be improved compared to the case where a legacy A-PPDU is sequentially transmitted to a plurality of different STAs.

The following are included as various aspects of the embodiments according to the present disclosure.

A wireless communication device according to a first disclosure is provided with: a transmission signal generation unit that generates an aggregate physical layer protocol data unit including a legacy preamble that has backward standard compatibility, a legacy header that has the backward standard compatibility, one or more data fields that are addressed to each user, one or more non-legacy headers that do not have the backward standard compatibility and in which information relating to the one or more data fields is described, and one or more non-legacy preambles that do not have the backward standard compatibility and are addressed to each of the users; and a transmission unit that transmits the aggregate physical layer protocol data unit in a wireless manner.

A wireless communication device according to a second disclosure is the wireless communication device of the aforementioned first disclosure, in which the one or more non-legacy headers each include destination information of the data fields, and information relating to data sizes of the data fields, and the transmission signal generation unit generates the aggregate physical layer protocol data unit for which aggregation is carried out in order of the legacy preamble, the legacy header, and the one or more non-legacy headers, and, in addition, for each of the users, aggregation is carried out in order of the non-legacy preambles of the users and the data fields of the users.

A wireless communication device according to a third disclosure is the wireless communication device of the aforementioned first disclosure, in which the one or more non-legacy headers include a first non-legacy header that includes destination information of the data fields, and one or more second non-legacy headers that include information relating to data sizes of the data fields.

A wireless communication device according to a fourth disclosure is the wireless communication device of the aforementioned third disclosure, in which the transmission signal generation unit generates the aggregate physical layer protocol data unit for which aggregation is carried out in order of the legacy preamble, the legacy header, the first non-legacy header, and the one or more second non-legacy headers, and, in addition, for each of the users, aggregation is carried out in order of the non-legacy preambles of the users and the data fields of the users.

A wireless communication device according to a fifth disclosure is the wireless communication device of the aforementioned third disclosure, in which the transmission signal generation unit generates the aggregate physical layer protocol data unit for which aggregation is carried out in order of the legacy preamble, the legacy header, and the first non-legacy header, and, in addition, for each of the users, aggregation is carried out in order of the non-legacy preambles of the users, the second non-legacy headers of the users, and the data fields of the users.

A wireless communication device according to a sixth disclosure is the wireless communication device of the aforementioned third disclosure, in which the transmission signal generation unit generates the aggregate physical layer protocol data unit for which aggregation is carried out in order of the legacy preamble, the legacy header, and the first non-legacy header, and, in addition, for each of the users, aggregation is carried out in order of the second non-legacy headers of the users, the non-legacy preambles of the users, and the data fields of the users.

A wireless communication device according to a seventh disclosure is the wireless communication device of the aforementioned second disclosure, in which the transmission unit transmits the legacy preamble, the legacy header, and the one or more non-legacy headers using a beam having a first directionality, and transmits the non-legacy preambles of the users and the data fields of the users using a beam having a second directionality that is different for each of the users and is higher than the first directionality.

A wireless communication device according to an eighth disclosure is the wireless communication device of the aforementioned fourth disclosure, in which the transmission unit transmits the legacy preamble, the legacy header, the first non-legacy header, and the second non-legacy headers using a beam having a first directionality, and transmits the non-legacy preambles of the users and the data fields of the users using a beam having a second directionality that is different for each of the users and is higher than the first directionality.

A wireless communication device according to a ninth disclosure is the wireless communication device of the aforementioned fifth or sixth disclosure, in which the transmission unit transmits the legacy preamble, the legacy header, the first non-legacy header, and the second non-legacy headers using a beam having a first directionality, and transmits the non-legacy preambles of the users and the data fields of the users using a beam having a second directionality that is different for each of the users and is higher than the first directionality.

A wireless communication device according to a tenth disclosure is the wireless communication device of the aforementioned fifth disclosure, in which the transmission unit transmits the legacy preamble, the legacy header, and the first non-legacy header using a beam having a first directionality, and transmits the second non-legacy headers of the users, the non-legacy preambles of the users, and the data fields of the users using a beam having a second directionality that is different for each of the users and is higher than the first directionality.

A wireless communication device according to an eleventh disclosure is the wireless communication device of the aforementioned fourth disclosure, in which the transmission signal generation unit aggregates the second non-legacy header for a second user at a stage subsequent to the second non-legacy header for a first user, and aggregates the non-legacy preamble for the second user and the data field for the second user at a stage subsequent to the non-legacy preamble for the first user and the data field for the first user.

A wireless communication method according to a twelfth disclosure includes: generating an aggregate physical layer protocol data unit having a legacy preamble that has backward standard compatibility, a legacy header that has the backward standard compatibility, one or more data fields that are addressed to each user, one or more non-legacy headers that do not have the backward standard compatibility and in which information relating to the one or more data fields is described, and one or more non-legacy preambles that do not have the backward standard compatibility and are addressed to each of the users; and transmitting the aggregate physical layer protocol data unit in a wireless manner.

Heretofore, various types of embodiments have been described with reference to the drawings; however, it goes without saying that the present disclosure is not restricted to these examples. It is obvious that a person skilled in the art could conceive of various types of altered examples or modified examples within the categories described in the claims, and naturally it is to be understood that these also belong to the technical scope of the present disclosure. Furthermore, the constituent elements in the aforementioned embodiments may be arbitrarily combined without deviating from the purpose of the disclosure.

In the aforementioned embodiments, the present disclosure has been described with examples in which hardware is used to configure the present disclosure; however, it is also possible for the present disclosure to be realized also by using software in cooperation with hardware.

Furthermore, the function blocks used in the descriptions of the aforementioned embodiments are typically realized as LSIs, which are integrated circuits having an input terminal and an output terminal. The integrated circuits may control the function blocks used in the descriptions of the aforementioned embodiments, and may be provided with input and output. These may be implemented separately as single chips or may be implemented as a single chip in such a way as to include some or all of the function blocks. LSIs have been mentioned here; however, the function blocks may also be referred to as ICs, system LSIs, super LSIs, or ultra LSIs depending on differences in the degree of integration.

Furthermore, the circuit integration technique is not limited to that of an LSI, and function blocks may be realized using dedicated circuits or general-purpose processors. After an LSI is manufactured, an FPGA (field programmable gate array) that can be programmed, or a reconfigurable processor with which the connections or settings of circuit cells within an LSI can be reconfigured, may be used.

In addition, if circuit integration technology that replaces LSI appears as a result of another technology that is an advancement in semiconductor technology or is derived therefrom, naturally the other technology may be used to carry out the integration of function blocks. Biotechnology applications and the like are also a possibility.

INDUSTRIAL APPLICABILITY

The present disclosure is useful as a wireless communication device and a wireless communication method capable of maintaining backward compatibility with IEEE 802.11ad in millimeter wave band wireless communication and improving the transmission speed of an entire network.

REFERENCE SIGNS LIST

800 transmission device of legacy device
801, 901 transmission signal generation unit
801*a*, 901*a* legacy STF generation unit
801*b*, 901*b* legacy CEF generation unit
801*c*, 901*c* legacy header generation unit
802, 902 transmission unit
803, 903 antenna
804, 904 antenna pattern control unit 900 transmission device of non-legacy device
901d non-legacy header A generation unit
901e non-legacy header B generation unit
901f non-legacy STF generation unit
901g non-legacy CEF generation unit
905 destination control unit

The invention claimed is:

1. A wireless communication device comprising:
a transmission signal generator that generates an aggregate physical layer protocol data unit (A-PPDU) addressed to a plurality of users, the A-PPDU including a leading PPDU and one or more following PPDUs that follow the leading PPDU in a time axis,
wherein the leading PPDU includes a legacy preamble that has backward standard compatibility, a legacy header that has the backward standard compatibility, and one or more non-legacy headers that do not have the backward standard compatibility, and
wherein each of the one or more following PPDUs includes a non-legacy preamble that does not have the backward standard compatibility and a data field addressed to corresponding one of the plurality of users; and
a transmitter that transmits the A-PPDU in a wireless manner, wherein for each of the one or more following PPDUs, the non-legacy preamble and the data field are transmitted by using a directional beam for a user to which the data field is addressed.

2. The wireless communication device according to claim 1,
wherein the one or more non-legacy headers each include destination information of data fields including the data field, and information relating to data sizes of the data fields, and
the transmission signal generator generates the A-PPDU for which aggregation is carried out in order of the legacy preamble, the legacy header, and the one or more non-legacy headers, and, in addition, for each of the plurality of users, aggregation is carried out in order of non-legacy preambles of the plurality of users and the data fields of the plurality of users.

3. The wireless communication device according to claim 1, wherein the one or more non-legacy headers include a first non-legacy header that includes destination information of data fields including the data field, and one or more second non-legacy headers that include information relating to data sizes of the data fields.

4. The wireless communication device according to claim 3, wherein the transmission signal generator generates the A-PPDU for which aggregation is carried out in order of the legacy preamble, the legacy header, the first non-legacy header, and the one or more second non-legacy headers, and, in addition, for each of the plurality of users, aggregation is carried out in order of the non-legacy preambles of the plurality of users and data fields of the plurality of users.

5. The wireless communication device according to claim 3, wherein the transmission signal generator generates the A-PPDU for which aggregation is carried out in order of the legacy preamble, the legacy header, and the first non-legacy header, and, in addition, for each of the plurality of users, aggregation is carried out in order of non-legacy preambles of the plurality of users, the second non-legacy headers of the plurality of users, and data fields of the plurality of users.

6. The wireless communication device according to claim 3, wherein the transmission signal generator generates the A-PPDU for which aggregation is carried out in order of the legacy preamble, the legacy header, and the first non-legacy header, and, in addition, for each of the plurality of users, aggregation is carried out in order of second non-legacy headers of the plurality of users, non-legacy preambles of the plurality of users, and data fields of the plurality of users.

7. The wireless communication device according to claim 2, wherein the transmitter
transmits the legacy preamble, the legacy header, and the one or more non-legacy headers using a beam having a first directionality, and
transmits the non-legacy preambles of the plurality of users and the data fields of the plurality of users using a beam having a second directionality that is different for each of the plurality of users and is higher than the first directionality.

8. The wireless communication device according to claim 4, wherein the transmitter
transmits the legacy preamble, the legacy header, the first non-legacy header, and the second non-legacy headers using a beam having a first directionality, and
transmits the non-legacy preambles of the plurality of users and the data fields of the plurality of users using a beam having a second directionality that is different for each of the plurality of users and is higher than the first directionality.

9. The wireless communication device according to claim 5, wherein the transmitter
transmits the legacy preamble, the legacy header, the first non-legacy header, and the second non-legacy headers using a beam having a first directionality, and
transmits the non-legacy preambles of the plurality of users and the data fields of the plurality of users using a beam having a second directionality that is different for each of the plurality of users and is higher than the first directionality.

10. The wireless communication device according to claim 5, wherein the transmitter
transmits the legacy preamble, the legacy header, and the first non-legacy header using a beam having a first directionality, and
transmits the second non-legacy headers of the plurality of users, the non-legacy preambles of the plurality of users, and the data fields of the plurality of users using a beam having a second directionality that is different for each of the plurality of users and is higher than the first directionality.

11. The wireless communication device according to claim 4, wherein the transmission signal generator
aggregates the second non-legacy header for a first user of the plurality of users at a stage subsequent to the second non-legacy header for a second user of the plurality of users, and
aggregates the non-legacy preamble for the first user and the data field for the first user at a stage subsequent to the non-legacy preamble for the second user and the data field for the second user.

12. A wireless communication method including:
generating an aggregate physical layer protocol data unit (A-PPDU) addressed to a plurality of users, the A-PPDU including a leading PPDU and one or more following PPDUs that follow the leading PPDU in a time axis, wherein the leading PPDU includes a legacy preamble that has backward standard compatibility, a legacy header that has the backward standard compatibility, and one or more non-legacy headers that do not have the backward standard compatibility, wherein each of the one or more following PPDUs includes a non-legacy preamble that does not have the backward standard compatibility and a data field addressed to corresponding one of the plurality of users; and transmitting the aggregate physical layer protocol data unit in a wireless manner, wherein for each of the one or more following PPDUs, the non-legacy preamble and the data field are transmitted by using a directional beam for a user to which the data field is addressed.

* * * * *